United States Patent
Sebastian

(10) Patent No.: US 12,106,334 B2
(45) Date of Patent: Oct. 1, 2024

(54) ARTIFICIAL INTELLIGENCE-BASED SYSTEM AND METHOD FOR GRADING COLLECTIBLE TRADING CARDS

(71) Applicant: Tina Anne Sebastian, Lewis Center, OH (US)

(72) Inventor: Tina Anne Sebastian, Lewis Center, OH (US)

( * ) Notice: Subject to any disclaimer, the term of this patent is extended or adjusted under 35 U.S.C. 154(b) by 230 days.

(21) Appl. No.: 17/856,984

(22) Filed: Jul. 2, 2022

(65) Prior Publication Data

US 2022/0374947 A1 Nov. 24, 2022

Related U.S. Application Data

(60) Provisional application No. 63/185,547, filed on May 7, 2021.

(51) Int. Cl.
G06Q 30/00 (2023.01)
G06Q 30/02 (2023.01)
G06T 7/00 (2017.01)
G06T 7/13 (2017.01)

(52) U.S. Cl.
CPC ....... *G06Q 30/0278* (2013.01); *G06T 7/0002* (2013.01); *G06T 7/13* (2017.01); *G06T 2207/30168* (2013.01)

(58) Field of Classification Search
None
See application file for complete search history.

(56) References Cited

U.S. PATENT DOCUMENTS

| | | | |
|---|---|---|---|
| 8,325,197 B2* | 12/2012 | Won | H04N 19/436 345/506 |
| 2005/0035206 A1* | 2/2005 | Attia | G06T 5/20 235/462.25 |
| 2016/0048837 A1* | 2/2016 | Jin | G06Q 20/3276 705/76 |
| 2016/0210734 A1* | 7/2016 | Kass | G06T 7/001 |
| 2017/0148145 A1* | 5/2017 | Campbell | G06T 5/73 |
| 2019/0236747 A1* | 8/2019 | Zhong | G06F 21/64 |
| 2020/0226782 A1* | 7/2020 | Li | G06T 7/74 |
| 2021/0065353 A1* | 3/2021 | Potter | G06Q 30/0278 |

* cited by examiner

*Primary Examiner* — Matthew T Sittner
(74) *Attorney, Agent, or Firm* — Barry Choobin; Patent 360

(57) ABSTRACT

A system and method for digitally grading collectible trading cards on a predefined standard scale. The collectible trading cards are graded using their images. First, an image is converted to grayscale image. The grayscale image is subjected to a set of algorithms, such as edge detection algorithm, threshold inversion algorithm, wavelet transform algorithm, corner detection algorithm, color filtering algorithm, and an image sharpen algorithm to obtain respective image features as outputs. The output can be processed using a bag of visual words computer vision model to obtain quantitative data. The quantitative data can then be processed using a pre-trained machine learning model to obtain a grade for the collectible trading card.

4 Claims, 2 Drawing Sheets

ARTIFICIAL INTELLIGENCE-BASED SYSTEM AND METHOD FOR GRADING COLLECTIBLE TRADING CARDS

CROSS-REFERENCE TO RELATED APPLICATIONS

This application claims priority from a U.S. Provisional Patent Appl. No. 63/185,547 filed on May 7, 2021, which is incorporated herein by reference in its entirety.

FIELD OF INVENTION

The present invention relates to a system and method for grading collectible trading cards, and more particularly, the present invention relates to a system and method that uses a combination of image processing and artificial intelligence for grading collectible trading cards.

BACKGROUND

Trading cards are collectible objects that are in the form of an image card. The trading card can be made from thick paper or a paper board. The image can be of a person, thing, or place. The person can be any popular person, such as a sports celebrity. Similarly, an important event, place, or thing can be the image on the trading card. A brief description is also provided for the image on the trading card.

Card grading is a process of authenticating and ranking a trading card by third-party services. The card is first evaluated for authenticity and then ranked on a pre-determined scale. The trading card can then be packed safely and cataloged. Valuation of the card can also be done. The physical card grading process is laborious, slow, and time-consuming. A need for digitalized card grading process is desired. Few methods for digital card grading are known in the art. For example, a U.S. Pat. No. 9,767,163 granted to Tag P LLC entitled "Computerized technical authentication and grading system for collectible objects" discloses a computerized system and method of grading and authenticating collectibles utilizing digital imaging devices and processes to provide an objective, standardized, consistent high-resolution grading of collectible objects, such as but not limited to sport and non-sport trading cards. The disclosure eliminates the subjectivity present in the human grading process and overcomes the inherent limitations of the human eye. The known apparatuses and methods for digital card grading use costly and complex equipment, such as specialized image acquisition devices.

A need is therefore appreciated for a system and method for digital card grading that is devoid of the above drawbacks.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method for digital card grading that is simple to use.

It is another object of the present invention that additional equipment is not required making the process cost-effective.

It is still another object of the present invention that the method is time-efficient.

It is a further object of the present invention that the system and method are trustworthy.

It is a further object of the present invention to avoid the need of sending physical cards for grading.

It is still a further object of the present invention that human error and any other subjective error can be avoided resulting in reproductive results.

In one aspect, disclosed is a system and method for grading a collectible trading card on a predefined scale, the method implemented with the system comprising a processor and a memory, the method comprises receiving, an image of the collectible trading card from a user device; converting the image to a grayscale image; applying an edge detection algorithm to the grayscale image to extract edge features; applying a threshold inversion algorithm to the grayscale image to extract contrast/centering features; applying a wavelet transform algorithm to the grayscale image to extract texture/surface features; applying a corner detection algorithm to the grayscale image to extract corner information; applying a color filtering algorithm to the grayscale image to extract stain detection features; applying an image sharpen algorithm to the grayscale image to obtain an output and comparing the output with the image to obtain out-of-focus information; processing the edge features, contrast/centering features, texture/surface features, corner information, stain detection features, and out-of-focus information using a bag-of-visual-words model to obtain quantitative data; and subjecting the quantitative data to a pre-trained machine learning model to obtain a grade for the collectible trading card, wherein the grade is associated to the collectible trading card. The method further comprises capturing the image of the collectible trading card by a camera coupled to the user device. The method further comprises training a machine learning model using a set of pre-graded training images of collectible trading cards to obtain the pre-trained machine learning model. The method further comprises converting each training image of the pre-graded training images to a grayscale training image; processing each grayscale training image using a plurality of predefined algorithms to obtain a plurality of outputs, the plurality of predefined algorithms comprise the edge detection algorithm, the threshold inversion algorithm, the wavelet transform algorithm, the corner detection algorithm, the color filtering algorithm, and the image sharpen algorithm; subjecting the plurality of outputs to the bag-of-visual-words model to obtain respective quantitative data for each output; and generating a feature vector for each output using the respective quantitative data, wherein the feature vector is configured to grade the respective output based on the respective quantitative data.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
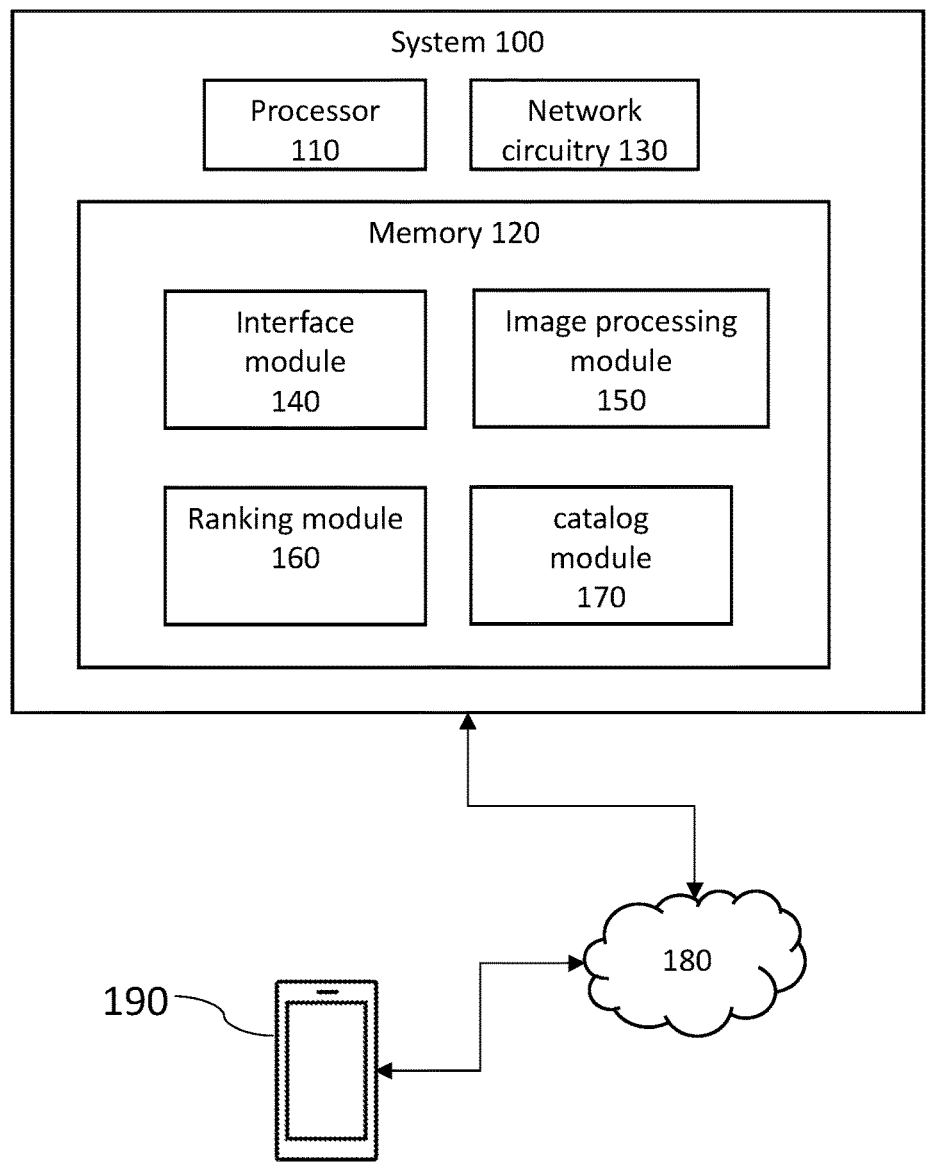
FIG. 1 is a block diagram showing the architecture and environment of the disclosed system, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be outlined to provide a thorough understanding of the subject innovation. It may be evident, however, that the claimed subject matter may be practiced without these specific details. In other instances, well-known structures and apparatus are shown in block diagram form to facilitate describing the subject innovation. Moreover, the drawings may not be to scale.

Disclosed is a system and method for the digital grading of collectible trading cards. The disclosed system and method use image recognition algorithms and artificial intelligence for card grading, thus does not require any specialized image recognition devices, making the process cost-effective and faster. Referring FIG. 1 is a block diagram showing the architecture of the disclosed system 100. The system can receive an image of the trading card and can process the image using a combination of image recognition algorithms and artificial intelligence for grading. The image of the card can be analyzed for the condition of its surface, corners, edges, stains, out-of-focus print, and general features to assign a final grade based on a predefined scale, such as ranging between A and F, wherein A is for the best condition. System 100 can include a processor 110 and a memory 120. The processor can be any logic circuitry that responds to, and processes instructions fetched from the memory. The memory may include one or more memory chips capable of storing data and allowing any storage location to be directly accessed by the processor. The memory includes modules according to the present invention for execution by the processor to perform one or more steps of the disclosed methodology.

The system can further include a network circuitry 130 for connecting to a network 180. The system 100 can connect to a user device 190 through the network. The user device can be a desktop, laptop, smartphone, tablet computer, digital camera system, and the like. It is understood, however, that FIG. 1 shows the system 100 and user device 190 as two separate devices, however, the system can be embodied in the user device without departing from the scope of the present invention. The network can be a wired, wireless network, or a combination of wired and wireless networks. For example, the network may be a local area network (LAN), a wide area network (WAN), a wireless WAN, a wireless LAN (WLAN), a metropolitan area network (MAN), a wireless MAN network, a cellular data network, a cellular voice network, the Internet, etc. The network can be a secured or unsecured network.

The memory 120 can include an interface module 140, an image processing module 150, a ranking module 160, and a catalog module 170. The interface module 140 upon execution by the processor can provide an interface for the user to interact with the disclosed system. The image processing module upon execution by the processor can process an image of the card for use by the ranking module 160. The ranking module, also referred to herein as the machine learning module upon execution by the processor can provide for training a machine learning model and using the machine learning model can grade the trading card using the image quantitative received from the image processing module. The catalog module can store the image with grading information in a sharable format.

The interface module allows a user to interact with the disclosed system, wherein the user can upload and download information from the system using the interface. The user can upload the image using the interface. The interface can be provided as application software that can be installed on the user device. The application software can be developed for Android™, iOS, and any other known operating platform for mobile devices. The application software can be made available through a distribution service provider, for example, Google Play™ operated and developed by Google, and the app store by Apple. In addition to the application software, a website-based interface can also be provided through the world-wide-web. The application software can also be provided for the desktop environment, such as Windows™, Linux, and macOS. The interface may permit interaction with a user through the user device, wherein information can be presented within the interface by the system 100 and information can be received by the system 100 from the user. The gradings, the image of the card, and a catalog that includes the cataloged card can also be presented to the user through the interface.

First, the user can access the disclosed system through the interface. The user can be provided with login credentials such as a username and password for secure access. The user can then upload an image of the trading card using the interface, wherein the system can receive the uploaded image of the card, at step 210. The interface can allow a user to capture the image of the card using a camera coupled to the user device. For example, the user can use his smartphone to capture the image and upload the same. Any suitable camera can be used such as those that come in-build in smartphones, or a separate handheld camera can also be used. The interface may also allow a user to upload a file already stored in the memory of the user device. For example, the interface may allow the user to locate the file on the memory of the user device using the file system of the user device. The system can verify the uploaded image based on predefined rules. Should there be any error in the processing of the image, the error can be displayed to the user through the interface. The system can optionally save the image received in the memory of the system.

The image can be converted to a gray scale by the image processing module, at step 220. Thereafter, an edge detection algorithm can be applied to extract the edges of the image, at step 230. A threshold inversion algorithm can then apply to extract contrast/centering features, at step 240. A wavelet transform algorithm is then applied to extract texture/surface features, at step 250. A corner detection algorithm is applied to extract corner information, at step 260. A color filtering algorithm is applied to extract stain detection features 270. An image sharpen algorithm is applied and the output is compared with the original image to extract out-of-focus information, at step 280. The image features and information obtained at each of the steps from 230 to 280 can be subjected to a bag-of-visual-words model to obtain quantitative image data. The bag-of-visual-words model is known in computer vision technologies. The bag-of-visual-words model is adapted from Natural Language Processing (NLP)Ts bag of words (BoW). In a bag of words, is counted the number of each word that appears in the referenced document, use the frequency of each word to extract the keywords of the document, and make a frequency histogram from it. The same concept is applied as a visual bag of words, in the case of image classification, wherein the image features are considered as "words". Image features are simply patterns detected in an image. Features are detected and descriptors for each feature are extracted from the input image and built into a visual dictionary.

Figure 2:
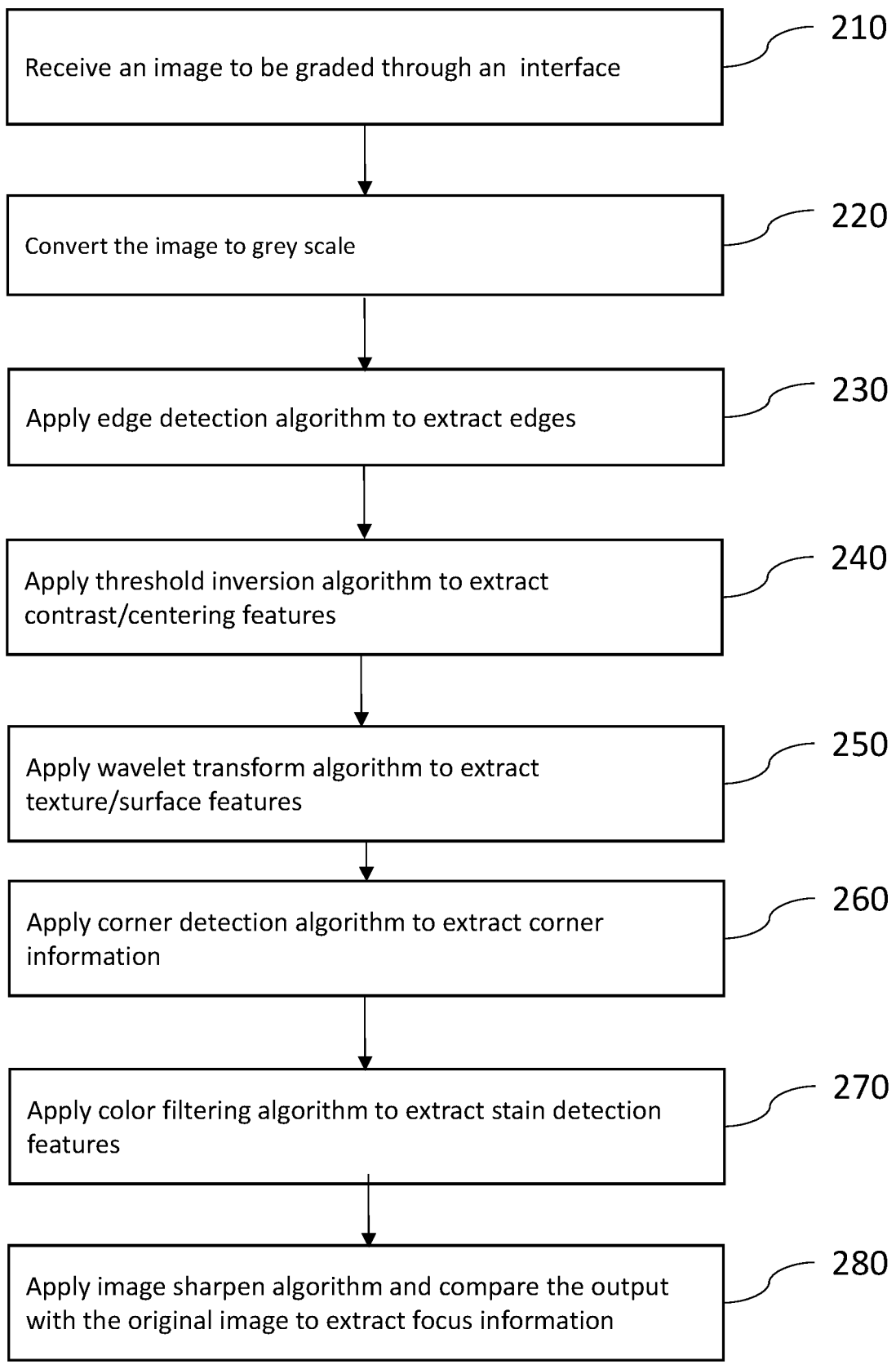
FIG. 2 is a flow chart showing an exemplary embodiment of the image processing module, according to an exemplary embodiment of the present invention.

A pre-trained machine learning module can then process the quantitative image data to classify the image and obtain a grade for the collectible trading card. The training dataset can be prepared from n training images. The training images can be pre-processed by subjecting each training image to the image proccing module as shown in FIG. 2. The pre-processed images can be subjected to classification methods. The training images are manually classified and labeled by the grades assigned to them initially. The grades for the training data may be sourced from professional graders in the field or a set of previously graded cards. The grades for each training image can include surface, corner, edge, and centering grades. Numeric class labels are assigned to each training image in each set. Numeric class labels are numbers from 1 to 10 that are calculated by taking the average of the surface, corner, edge, and centering grades (also on a scale of 1 to 10) of each training image.

The extracted feature vector for each set of training images is saved into a list. MultiClass SupportVectorMachines/Neural Networks are used, with a variety of selection strategies including but not limited to Sequential Selection and a variety of kernels including but not limited to Chi Square. The kernel is trained by adjusting the complexity, tolerance, cache size, and selection strategy to get the best-matched output grades for the training images. The extracted feature vector is saved for the target edge extraction image. The extracted feature vector is passed into the trained and saved models to grade edges. A weighted formula is applied to all component grades with increased weightage given to edges, corners, and surfaces, to find the final card condition grade. The component grade and final grade are mapped to a scale ranging from A to F or 1 to 10, or any comparable grading scales as needed. The received image data received from the image processing module can be processed by the machine learning model using the trained model to rank the image on the predefined scale. The interface can allow the user to share the digitalized card with ranking and catalog information on social networking platforms.

GRAYSCALE CONVERSION PREPROCESSING ALGORITHMS: In one implementation of generating the grayscale versions of the input images is to calculate the average of the red, green, and blue pixels. This combines the luminance contributed by each color band into a reasonable gray approximation. The technique of gamma compression may also be utilized, such that it warps the color scale so that it contributes more value in the lower end of the range and spreads them out more widely in the higher end. The benefit of gamma compression is that it gets rid of the banding in smoothly varying dark colors. However, to do any further band manipulation like addition, subtraction or average, the compression will need to be undone or transformed into a more linear representation of the luminance. In addition, gamma compression and decompression can slow down the process, as well as disrupt the extraction of features needed for the accurate grading of sports and other trading cards. To avert this, we use a linear approximation technique utilizing the following equation and specified coefficients.

$$\text{Grayscale Pixel} = 0.49R + 0.321G + 0.237B$$

This is known as the RMY algorithm, and any equivalent set of coefficients may be utilized. Color images are represented as three-dimensional numeric arrays—three two-dimensional arrays—one each for red, green, and blue channels. Each one has one value per pixel and their ranges are identical. The range of pixel values is from 0 to 22. Lower numeric values indicate darker shades and higher values indicate lighter shades. The values can be divided by 255 to get a range of values from 0 to 1. The grayscale images are the inputs to the next stage of preprocessing algorithms in the grading pipeline.

EDGE DETECTION PREPROCESSING ALGORITHMS: Edge detection techniques are simply image processing techniques to identify points in a digital image, with discontinuation or sharp changes in the image brightness. Edge detection is a key processing step in the fields of image processing, pattern recognition, and computer vision. The convolution operation is used for processing high-resolution digital images. The edge detection methods used for card grading include but are not limited to Sobel edge detection, Laplacian edge detection, Prewitt edge detection, and Canny edge detection. The Sobel edge detection uses a filter that gives more emphasis to the center of the filter. Laplacian edge detection uses one filter called a kernel and performs second-order derivatives, which is more effective than Sobel edge detection. The disadvantage is that it is sensitive to noise, especially Gaussian noise. This can be reduced with the use of Gaussian smoothing. The most effective and complex technique is the Canny edge detection, which is a multi-stage algorithm that includes converting the input image to grayscale first, reducing noise since any edge detection that uses derivatives is sensitive to noise, and calculating the gradient to help identify the edge intensity and direction, applying non-maximal suppression to thin the edges of the image, applying a double threshold to identify the strong, weak and irrelevant pixels in the image and finally using hysteresis edge tracking to convert weak pixels into strong ones, only if there is a strong pixel around it.

SURFACE FEATURE DETECTION PREPROCESSING ALGORITHMS: Spatial domain is a normal image space that is represented as a matrix of pixels. Transformation techniques are directly applied to image pixel values. The frequency domain is the rate at which these pixel values change in the spatial domain. Here, frequency refers to the rate of change of color components in an image. Areas of high frequencies correspond to rapid color changes while areas of low frequencies correspond to gradual changes. Transformation techniques cannot operate directly on the image, unlike the spatial domain. The image first needs to be transformed into its frequency distribution before processing it. The output is not an image but a transformation. Inverse transformation may be applied to the processed output. Surface feature detection for card grading utilizes mathematical transforms under the frequency domain, including but not limited to Fourier transform, Laplace transform, Z-transform and wavelet transform. The wavelet analysis method is a time-frequency method that selects the approximate frequency band adaptively, based on the characteristics of the signal. The frequency band then matches the spectrum which improves the time-frequency resolution. Wavelet is simply a wave-like oscillation with an amplitude that begins at zero, increases, and then decreases back to zero and can be visualized as a brief oscillation. Fourier transformation has the disadvantage of not including temporal details. High-frequency resolution corresponds with poor temporal resolution and vice versa. To overcome the drawbacks of the Fourier methods, wavelets are functions that are concentrated in time and frequency around a certain point. The most appropriate use for wavelet transform is in the case of non-stationary signals since it achieves good frequency resolution for low-frequency components and high temporal resolution for high-frequency components. Wavelet analysis is used to divide the information present on an image, considered as signals, into two discrete components - approximations and details (sub-signals). Wavelet transform is also used to remove noise in an image, especially Gaussian noise, using global thresholding in the image's frequency distribution after performing wavelet decomposition. The thresholding used may be both soft and hard thresholding. Soft thresholding is the process of first setting the coefficients to zero, whose absolute values are lower than the threshold, and then shrinking the nonzero coefficients to zero. Hard thresholding is the process of setting to zero, the coefficients, whose absolute values are lower than the threshold. The steps are as follows:

1) Estimate the threshold for all detailed coefficients.
2) Apply the threshold on all levels.
3) The output is the denoised matrix for all the detailed components at every level.
4) Use matrices or coefficients for inverse discrete wavelength transformation to reconstruct the image. This yields the denoised reconstructed image.

The discrete wavelet transforms (DWT) of a one-dimensional signal f[n] can be calculated by passing it through a high pass and low pass filter simultaneously. If a low pass filter has impulse response g[n], then DWT can be evaluated by calculation, the convolution of the original signal with the impulse response at y[n]=(x*y)[n], Wherein, x is the one-dimensional signal (image), y is the impulse response of the low pass file, * is the complex conjugate.

The signal is simultaneously decomposed with a high pass filter. The wavelet decomposition utilizes various wavelet techniques, including but not limited to Daubechies-4 wavelet techniques, Haar simple wavelet techniques, Shannon wavelet techniques, and Gabor complex wavelet techniques. The Haar wavelet is preferred for purposes of grading cards since this is the simplest type of Daubechies wavelet, reproducing constant functions only and working well for the square waves involved in the process.

The output of the images that are passed through the texture and surface feature detection preprocessing algorithms are passed into the next steps of the grading pipeline, including conversion into feature vectors and use with training and testing models.

CORNER DETECTION PREPROCESSING ALGORITHM: The corner detection algorithm is a mathematical way of determining which windows produce large variations when moved in any direction. A score of R is associated with each window. Corners are regions in the image with large variations in intensity in all directions. Corner detection for card grading utilizes algorithms including but not limited to the Harris Corner Detector and the Shi-Tomasi Corner Detector. This finds the difference in intensity for a displacement of (u, v) in all directions.

Difference in intensity=Window function(Shifted intensity−Intensity)

The window function can either be a rectangular window or a Gaussian window which gives weights to pixels underneath. At this point, an equation is applied to generate a score to determine if a window has a high probability of containing a corner or not.

$R=det(M)-k(trace(M))2R=det[10]M-k$ trace $M2$

Wherein, det(M)=λ1 λ2, trace(M)=λ1+λ2, λ1 and λ2 are the eigenvalues of M

So, the magnitudes of these eigenvalues decide whether a region is a corner, an edge, or a flat. When |R| is small, i.e., when λ1 and λ2 are small, the region is flat. When R<0, i.e., when λ1>>λ2 or vice versa, the region is an edge. When R is large, which happens when λ1 and λ2 are large, and λ1~λ2, the region is a corner. The result is a grayscale image with the above-calculated scores. Thresholding for a suitable score gives you the corners in the image.

The card grading process further builds up the corner detection algorithm to extract only the four vertices that are traditionally used in manual card grading. While the output of the previous step may be used to further strengthen the observations of the edge detection as well as the surface detection, eliminating all other detected corners, other than the four physical corners, help refine the true corner detection results. This is done by automatically slicing the card image into four pieces and using a predefined window to extract the expected corner from the four image pieces and utilizing only the scores associated with these highlighted corners to prepare the inputs for the sub-grading process for grading corners.

CENTERING GRADE PREPROCESSING ALGORITHMS: The preprocessing steps for determining the centering grade involve both grayscale conversion and threshold inversion. We do not use measurements of the distance from the edges since this leads to erroneous results in the case of cards without a distinct border or die-cut cards or cards with images bleeding over the edges. To ensure that the centering grades are accurate in all cases including the few mentioned above, a method was developed to measure the amounts of black and white on both sides after applying the threshold inversion method.

The threshold inversion for the card grading process utilizes various binary thresholding algorithms, including but not limited to simple thresholding, adaptive thresholding, Otsu's binarization, etc. For simple binary thresholding, the same threshold value is applied for every pixel. If the pixel value is smaller than the threshold, it is set to 0, otherwise, it is set to a maximum value. Simple binary thresholding will not work well with images that have different lighting conditions in different areas. This is solved using adaptive thresholding. The threshold is determined for a pixel based on a small region around it. This means that different regions of the same image will get different thresholds and better results for images with varying levels of illumination.

Adaptive thresholding can be either adaptive mean thresholding or adaptive gaussian thresholding. In adaptive mean thresholding, the threshold value is the mean of the neighborhood area, while in adaptive gaussian thresholding, the threshold value is a gaussian weighted sum of the neighborhood values.

After thresholding has been achieved, the image is split into two halves and the black and white pixels on either side are counted and added to get four distinct values—left white count, left black count, right white count, and right black count. This is followed by calculating the white and black centering ratios by dividing the right white count by the left white count and the right black count by the left black count. These ratios are then compared against the following thresholds to determine the centering grades of the card.

The output of the images that are passed through the centering preprocessing algorithms is passed into the next steps of the grading pipeline, including conversion into feature vectors and use with training and testing models.

TABLE 1

White/Black Ratio Thresholds & Corresponding Centering Grade:

| Condition | Centring Grade |
|---|---|
| W/B ratio > 1.2 & W/B ratio < 1.5 | 10 |
| W/B ratio > 1.5 & W/B ratio < 1.8 | 9 |
| W/B ratio > 1.8 & W/B ratio < 2.3 | 8 |
| W/B ratio > 2.3 & W/B ratio < 3 | 7 |
| W/B ratio > 3 & W/B ratio < 4 | 6 |
| W/B ratio > 4 & W/B ratio < 5 | 5 |
| W/B ratio > 5 & W/B ratio < 6 | 4 |
| W/B ratio > 6 & W/B ratio < 9 | 3 |
| W/B ratio > 9 | 2 |
| W/B ratio > 10 | 1 |

STAIN DETECTION PREPROCESSING ALGORITHMS: For stain detection, color segmentation or color filtering algorithms are adapted as a preprocessing step in the card grading process. Color segmentation is used for identifying specific regions having a specific color. RGB color is most widely used and is called an additive color space as the three-color shades add up to give color to the image. The threshold can be utilized to create a stain mask to separate the different colors. In addition to the RGB space, HSV space may also be utilized, which may be slightly better suited for purposes of stain detection in card grading, due to the advantage of localization.

OUT-OF-FOCUS DETECTION PREPROCESSING ALGORITHMS: To determine whether to assign the out-of-focus qualifier to a card, the IMAGE SHARPENING ALGORITHM is applied, and the output is compared pixel-wise to the original image to decide if the difference in sharpness exceeds a certain preset threshold. If the difference exceeds the predetermined threshold, and the card achieves a perfect score on all other fronts, an out-of-focus qualifier is assigned to the card.

Image sharpening algorithms include but are not limited to unsharp masking (USM). A simple sharpening algorithm subtracts a fraction of neighboring pixels from each pixel. The unsharp mask filter algorithm involves the subtraction of an unsharp mask from the specimen image. An unsharp mask is simply a blurred image that is produced by spatially filtering the specimen image with a Gaussian low-pass filter.

The size of the Gaussian kernel mask is a function of the parameter. The size of the kernel mask determines the range of frequencies that are removed by the Gaussian filter. Increasing the size of the kernel mask causes the Gaussian filter to remove a greater number of spatial frequencies from the unsharp mask image. The unsharp mask is then subtracted from the original image.

An unsharp mask filter operates by subtracting appropriately weighted parts of the unsharp mask from the original mask. The unsharp mask filter is preferred over other sharpening filters due to the flexibility of control since the parameters can be adjusted to be optimal for card grading purposes. The unsharp mask filter enhances edges and fine detail in the uploaded card image because the sharpening filters suppress low-frequency detail.

The sharpened images are then pixel-wise subtracted like the subtraction of the unsharp mask above, and the output is then thresholded and compared to determine if the difference in sharpness is above a certain threshold to justify the application of an out-of-focus qualifier to the grading report.

Machine learning algorithms such as Support Vector Machines (SVM) and AI algorithms such as Neural networks are used in the final stage to classify the preprocessed image vectors.

In one implementation, disclosed is a method for digitally grading the collectible trading cards using an image of the card. First, save the uploaded image of the collectible trading card to the cloud. The grading process can auto-start for grading the image of the card. The latest ungraded image can be retrieved from the cloud. The image can then be converted to a grayscale image. An edge detection algorithm can be applied to extract edges. An inversion algorithm can be applied to extract contrast/centering features. A wavelet transform algorithm can be applied to extract texture. A corner detection algorithm can be applied to extract corners. A color filtering algorithm can be applied to extract stain detection features. An image sharpening algorithm can be applied to compare with the original image for focus detection. The output of each algorithm can be processed to obtain a bag of visual words.

In one implementation, a trained machine learning model is disclosed that can grade the above-obtained image features for digitally grading the collectible trading card. Disclosed is a method for training the machine learning model. First, a set of pre-graded training images of collectible trading cards can be received by the system. The training images can be subjected to steps 220 to step 280 of FIG. 2. The different algorithms explained above can be applied to each of the training images to obtain the respective features and information. The output of each algorithm, as in steps 230 to 280, can be processed by the bag-of-visual-words model to obtain the respective quantitative data. Thereafter, the numeric labels can be assigned to each set of prepared training images.

The quantitative data for each output of the algorithms can be further processed. The extracted feature vector for each output of each training image can be saved to a list. Thereafter, multiclass SupportVectorMachines/neural networks can be used using a variety of selection strategies including but not limited to the sequential selection and a variety of kernels including but not limited to Chi-square. Train the kernel by adjusting the complexity, tolerance, cache size, and selection strategy to get the best-matched output grades for the training images. The extracted feature vector can be saved. Thereafter, can pass the extracted feature vector into the trained and saved model for grading the respective quantitative data of the output of different feature extraction algorithms i.e., corners detection feature vector output for training and target images to get corners grade, surface/texture detection feature vector output for training and target images to get surface grades, stain detection feature vector output for training and target images to get stain detection grade, image sharpen/comparison feature vector output for training and target images to get out of focus grade.

Once all the features could be graded by the respective feature vector, a weighted formula can be applied to all component grades with increased weightage given to edges, corners, and surfaces to find the final card condition grade. The component grades and the final grade can be mapped to a scale ranging from A to F or 1 to 10 or similar grades. A header with the final grade printed on the label with the accompanying scale and logo can be generated. Finally, the intermediate card outputs can be saved to the cloud, While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for grading a collectible trading card using a combination of image recognition algorithms and artificial intelligence on a predefined scale, the method implemented on a system comprising a processor and a memory, the method comprises:
   receiving, an image of the collectible trading card from a user device;
   converting the image to a grayscale image;
   applying an edge detection algorithm to the grayscale image to extract edge features;
   applying a threshold inversion algorithm to the grayscale image to extract contrast/centering features;
   applying a wavelet transform algorithm to the grayscale image to extract texture/surface features;
   applying a corner detection algorithm to the grayscale image to extract corner information;
   applying a color filtering algorithm to the grayscale image to extract stain detection features;
   applying an image sharpen algorithm to the grayscale image to obtain an output and comparing the output with the image to obtain out-of-focus information;
   processing the edge features, contrast/centering features, texture/surface features, corner information, stain detection features, and out-of-focus information using a bag-of-visual-words model to obtain quantitative data; subjecting the quantitative data to a pre-trained machine learning model to obtain a grade for the collectible trading card, wherein the grade is associated to the collectible trading card;
   training a machine learning model using a set of pre-graded training images of collectible trading cards to obtain the pre-trained machine learning model; converting each training image of the pre-graded training images to a grayscale training image;
   processing each grayscale training image using a plurality of predefined algorithms to obtain a plurality of outputs, the plurality of predefined algorithms comprises the edge detection algorithm, the threshold inversion algorithm, the wavelet transform algorithm, the corner detection algorithm, the color filtering algorithm, and the image sharpen algorithm;
   subjecting the plurality of outputs to the bag-of-visual-words model to obtain respective quantitative data for each output;
   generating a feature vector for each output using the respective quantitative data, wherein the feature vector is configured to grade the respective output based on the respective quantitative data.

2. The method according to claim 1, wherein the method further comprises:
   capturing the image of the collectible trading card by a camera coupled to the user device.

3. A system for grading a collectible trading card using a combination of image recognition algorithms and artificial intelligence on a predefined scale, the system comprising a processor and a memory, the system configured to implement a method, the method comprises:
   receiving, an image of the collectible trading card from a user device;
   converting the image to a grayscale image;
   applying an edge detection algorithm to the grayscale image to extract edge features;
   applying a threshold inversion algorithm to the grayscale image to extract contrast/centering features;
   applying a wavelet transform algorithm to the grayscale image to extract texture/surface features;
   applying a corner detection algorithm to the grayscale image to extract corner information;
   applying a color filtering algorithm to the grayscale image to extract stain detection features;
   applying an image sharpen algorithm to the grayscale image to obtain an output and comparing the output with the image to obtain out-of-focus information;
   processing the edge features, contrast/centering features, texture/surface features, corner information, stain detection features, and out-of-focus information using a bag-of-visual-words model to obtain quantitative data;
   subjecting the quantitative data to a pre-trained machine learning model to obtain a grade for the collectible trading card, wherein the grade is associated to the collectible trading card;
   training a machine learning model using a set of pre-graded training images of collectible trading cards to obtain the pre-trained machine learning model;
   converting each training image of the pre-graded training images to a grayscale training image;
   processing each grayscale training image using a plurality of predefined algorithms to obtain a plurality of outputs, the plurality of predefined algorithms comprises the edge detection algorithm, the threshold inversion algorithm, the wavelet transform algorithm, the corner detection algorithm, the color filtering algorithm, and the image sharpen algorithm;

subjecting the plurality of outputs to the bag-of-visual-words model to obtain respective quantitative data for each output; and generating a feature vector for each output using the respective quantitative data, wherein the feature vector is configured to grade the respective output based on the respective quantitative data.

4. The system according to claim 3, wherein the method further comprises:

capturing the image of the collectible trading card by a camera coupled to the user device.

* * * * *